(12) United States Patent
Lazzarotto et al.

(10) Patent No.: US 6,937,615 B1
(45) Date of Patent: Aug. 30, 2005

(54) MULTI-PURPOSE BRIDGE FOR WIRELESS COMMUNICATIONS

(75) Inventors: Sergio Lazzarotto, Marin (CH); Pierre Chênes, Ferreyres (CH); René Sommer, Renens (CH)

(73) Assignee: Logitech Europe S.A., (CH)

( * ) Notice: Subject to any disclaimer, the term of this patent is extended or adjusted under 35 U.S.C. 154(b) by 0 days.

(21) Appl. No.: 09/507,768

(22) Filed: Feb. 18, 2000

(51) Int. Cl.[7] .............................................. H04Q 7/06
(52) U.S. Cl. ..................................... 370/465; 370/466
(58) Field of Search ............................... 370/465, 466, 370/401, 535, 538, 352, 389, 392, 445, 344, 370/343; 455/168.1, 150.1, 179.1

(56) References Cited

U.S. PATENT DOCUMENTS

| | | | |
|---|---|---|---|
| 4,989,230 A * | 1/1991 | Gillig et al. ................. | 455/552 |
| 5,605,505 A * | 2/1997 | Han .............................. | 463/39 |
| 5,682,379 A * | 10/1997 | Mahany et al. .............. | 370/311 |
| 5,793,359 A | 8/1998 | Ushikubo ..................... | 710/64 |
| 5,793,416 A * | 8/1998 | Rostoker et al. .......... | 348/14.13 |
| 5,838,304 A | 11/1998 | Hall ............................ | 345/157 |
| 5,854,621 A * | 12/1998 | Junod et al. ................. | 345/158 |
| 5,881,366 A | 3/1999 | Bodenmann et al. ......... | 455/66 |
| 5,890,015 A | 3/1999 | Garney et al. ............... | 395/882 |
| 5,920,734 A | 7/1999 | Holmdahl ..................... | 395/893 |
| 5,940,381 A * | 8/1999 | Freeburg et al. ............ | 370/331 |
| 5,999,996 A | 12/1999 | Dunn ........................... | 710/64 |
| 6,006,105 A * | 12/1999 | Rostoker et al. ............ | 455/552 |
| 6,018,340 A | 1/2000 | Butler et al. ................ | 345/339 |
| 6,069,615 A | 5/2000 | Abraham et al. ............ | 345/168 |
| 6,373,827 B1 * | 4/2002 | Tayebi et al. ................ | 370/310 |
| 6,374,109 B1 * | 4/2002 | Shaheen et al. ............. | 455/434 |
| 6,393,008 B1 * | 5/2002 | Cheng et al. ................ | 370/338 |

FOREIGN PATENT DOCUMENTS

| | | | |
|---|---|---|---|
| CN | 88220901 | 12/1999 | |
| DE | 298 23 186 U 1 | 2/1999 | .......... G08C 17/02 |
| DE | 29922853 U1 | 4/2000 | |
| WO | WO 91/07826 | 5/1991 | .......... H03M 11/00 |
| WO | WO 98/56131 | 12/1998 | |
| WO | WO 99/28830 | 6/1999 | |
| WO | WO 01/18662 A1 | 3/2001 | ........... G06F 13/38 |

OTHER PUBLICATIONS

The Official Bluetooth Website, "The Official Bluetooth SIG Website," 1 page, publication date unknown, http://www.bluetooth.com/.

The Official Bluetooth Website, "The Bluetooth specification," 4 pages including "Specification intro,""Overview,""Core," and "Profiles," publication dates unknown, pages starting at http://www.bluetooth.com/developer/specification/specification.asp.

(Continued)

*Primary Examiner*—Melvin Marcelo
(74) *Attorney, Agent, or Firm*—Fenwick & West LLP

(57) ABSTRACT

A dual-purpose bridge for wireless communication allows both a low frequency (e.g., below 1 GHz) wireless communication standard and a high frequency (e.g., above 1 GHz) wireless communication standard to operate for a particular wireless communications device. Resources existing between the bridged standards can be shared to reduce the cost of implementing any one communication standard. The output signal of each communication system is coupled with a processor. The wireless communication standard that was used to transmit the output signal is determined and then the corresponding protocol is employed. Processing is performed in the processor and the resulting data can then be applied to a data port.

42 Claims, 7 Drawing Sheets

OTHER PUBLICATIONS

The Official Bluetooth Website, "FAQ," 5 pages including "General,""Technology,""Bluetooth SIG," and "Products," publication dates unknown, pages starting at http://www.bluetooth.com/bluetoothguide/faq/1.asp.

Michael Caton, Excite News Article, "A Yuletide Recipe for Bluetooth," 1 page, Dec. 2, 1999, http://www.excite.com/news/zd/991202/08/a yuletide-recipe.

Bluetooth SIGnal Newsletter No. 3, Nov. 1999, 8 pages, http://www.bluetooth.com/news/signal/1999/3.asp.

Bluetooth SIGnal Newsletter No. 4, Feb. 2000, 9 pages, http://www.bluetooth.com/news/signal/2000/1/asp.

Bluetooth White Paper, "Bluetooth PC Card Transport Layer," Aug. 25, 1999, 9 pages, http://www.bluetooth.com/developer/whitepaper/whitepaper.asp.

Bluetooth White Paper, "Bluetooth Protocol Architecture," Aug. 25, 1999, 20 pages, http://www.bluetooth.com/developer/whitepaper/whitepaper.asp.

Bluetooth White Paper, "Mapping Salutation Architecture APIs to Bluetooth Service Discovery Layer," Jul. 1, 1999, 26 pages, http://www.bluetooth.com/developer/whitepaper/whitepaper.asp.

The Official Bluetooth Website Press Release, "Motorola Investment in Digianswer Boosts Bluetooth and HomeRF Portfolio," Dec. 1, 1999, 4 pages, http://www.bluetooth.com/pressroom/pressrelease/pressrelease.asp.

The Official Bluetooth Website Press Release, "CATC Demonstrates Bluetooth Bus & Protocol Analyzer," Jan. 6, 2000, 3 pages, http://www.bluetooth.com/pressroom/pressrelease/pressrelease.asp.

The Official Bluetooth Website Press Release, "CATC Adds Bluetooth Protocol Decoding," Jan. 31, 2000, 3 pages, http://www.bluetooth.com/pressroom/pressrelease/pressrelease.asp.

The Official Bluetooth Website Press Release, "Extended Systems Demonstrates Wireless Bluetooth Protocol Stack at Developer's Conference in LA," Dec. 9, 1999, 5 pages, http://www.bluetooth.com/pressroom/pressrelease/pressrelease.asp.

The Official Bluetooth Website Press Release, "IVT Delivers the First Commerical Bluetooth™ Protocol Stack," Dec. 7, 1999, 4 pages, http://www.bluetooth.com/pressroom/pressrelease/pressrelease.asp.

Carmen Nobel, ZDNet: eWEEK News, "Intel Debuts Bluetooth Chip," Dec. 13, 1999, 2 pages, http://www.zdnet.com/eweek/stories/general/0,11011,2407338,00.html.

The Official Bluetooth Website, "Development tools," 2 pages, publication dates unknown, http://www.bluetooth.com/product/dev_tools/development.asp.

Technical Summary of the SWAP Specification, 1 page, publication date unknown, http://www.homerf.org/date/tech/hrfwgtec.pdf.

SWAP White Paper, "The Shared Wireless Access Protocol (SWAP), Voice & Data Communications for the Home", 4 pages, Mar. 1998, http://www.homerf.org/data/press/hrfwgmkt.pdf.

Compaq Computer Corporation News Release, "Compaq Launches New Cool and Easy Presario EZ2000 Series Internet PCs," 5 pages, Jan. 5, 2000, http://www.homerf.org/data/press/compaq011400.pdf.

Proxim, Inc. Press Release, "Proxim Unveils Strategy for Industry's First HomeRF Standard-Based Cordless Home Networking Products," 5 pages, Jun. 7, 1999, http://www.homerf.org/data/press/9906swap2.pdf.

Press Release, "Leading PC, Telecommunications and Networking Companies Announces Plans for Wireless Products Based on HomeRF Standard," 4 pages, Oct. 18, 1999, http://www.homerf.org/data/press/991018Release.pdf.

Phillips Semiconductor Press Release, "Phillips Semiconductors Offers Evaluation Board to Support New Wireless Home Network Specification," 3 pages, Jan. 5, 1999, http://www.homerf.org/data/press/SIC2010_rev1999final.pdf.

National Semiconductor Press Release, "National Semiconductor Delivers Industry's First Single-Chip Radio Transceiver for Emeging 2.4GHz Wireless Applications," 3 pages, Feb. 23, 1999, http://www.homerf.org/data/press/nsc.pdf.

HomeRF Press Release, "Industry Leading PC, Communications and Consumer Electronics Companies Unite to Establish a Wireless Communications Specification for the Home," 3 pages, Mar. 4, 1998, http://www.homerf.org/press/ctexo0498.html.

Siemens Press Release, "Siemens to Deliver Voice Component for HomeRF Technology," 3 pages, Jan. 6, 2000, http://www.homerf.org/data/press/siemens_010600.pdf.

HomeRF Press Release, "HomeRF Working Group Announces First SWAP Wireless Home Networking Products to Debut," 5 pages, Jun. 7, 1999, http://www.homerf.org/data/press/9906swap1.pdf.

Intel Press Release, "Intel Announces Plans for Wireless Anypoint™ Home Networking Products," 3 pages, Jan. 6, 2000, http://www.homerf.org/data/press/intel20000106.pdf.

DECTweb, "Answers to 'What is DECT?'," 5 pages, publication dates unknown, http://www.dectweb.com/introduction/answers.htm.

DECTweb, "DECT Standards Introduction & Overview," 3 pages, publication dates unknown, http://www.dectweb.com/Standards&Regs/StdsOverview.htm.

PCT Search Report, International Application No. PCT/IB014/00214, Apr. 24, 2002, 3 pages.

Sharp [publisher], "LZ85202 IrDA Control Host Controller with USB interface" Sharp, User's Guide, Ver. 1.1, 1999.

Chock, Ray; Petrilla, John; Crawford, Dick; et al. ; "IrDA Control Specification (Formerly IrBus), IrDA CIR (Control IR) Standard—Final Specifciaction" Final Revision, Jun. 10, 1998.

Green, Gary; "Questions from the Community," Incisor, Oct. 1999.

* cited by examiner

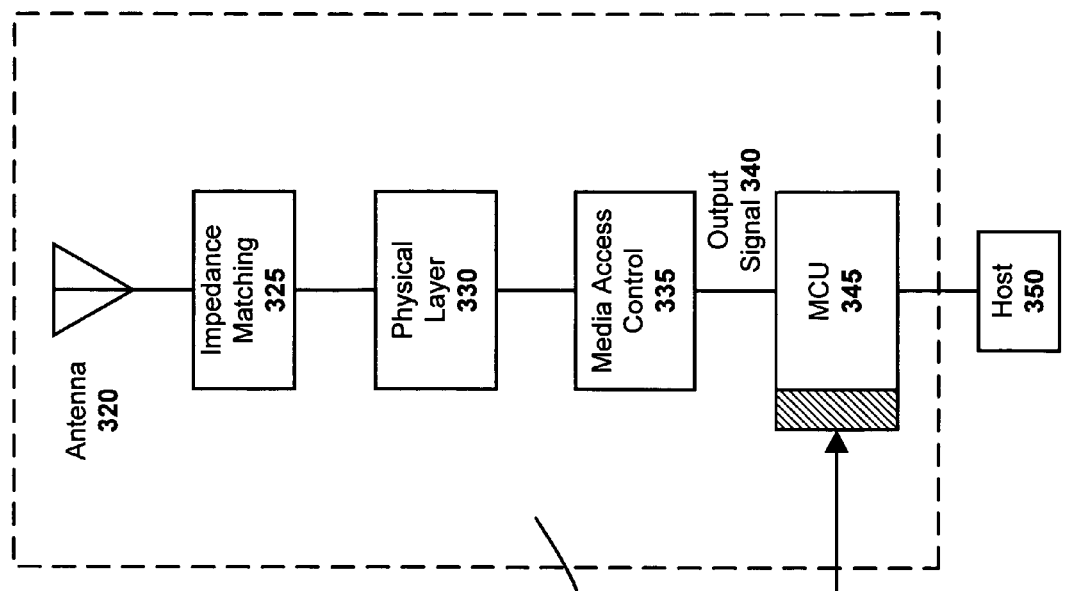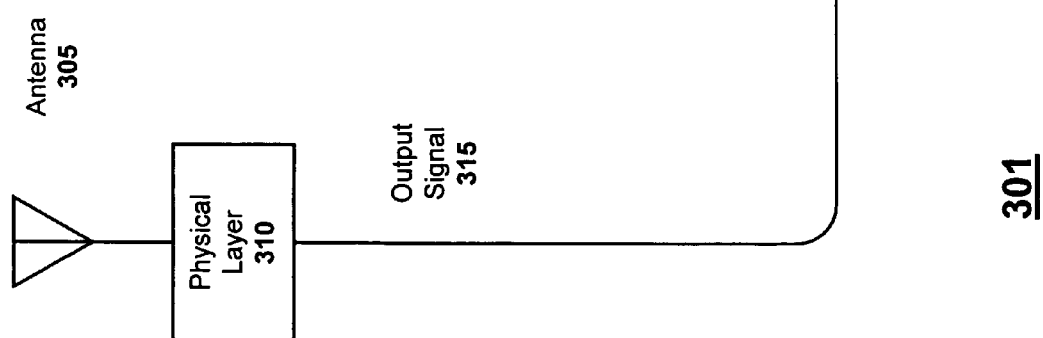
Fig. 3

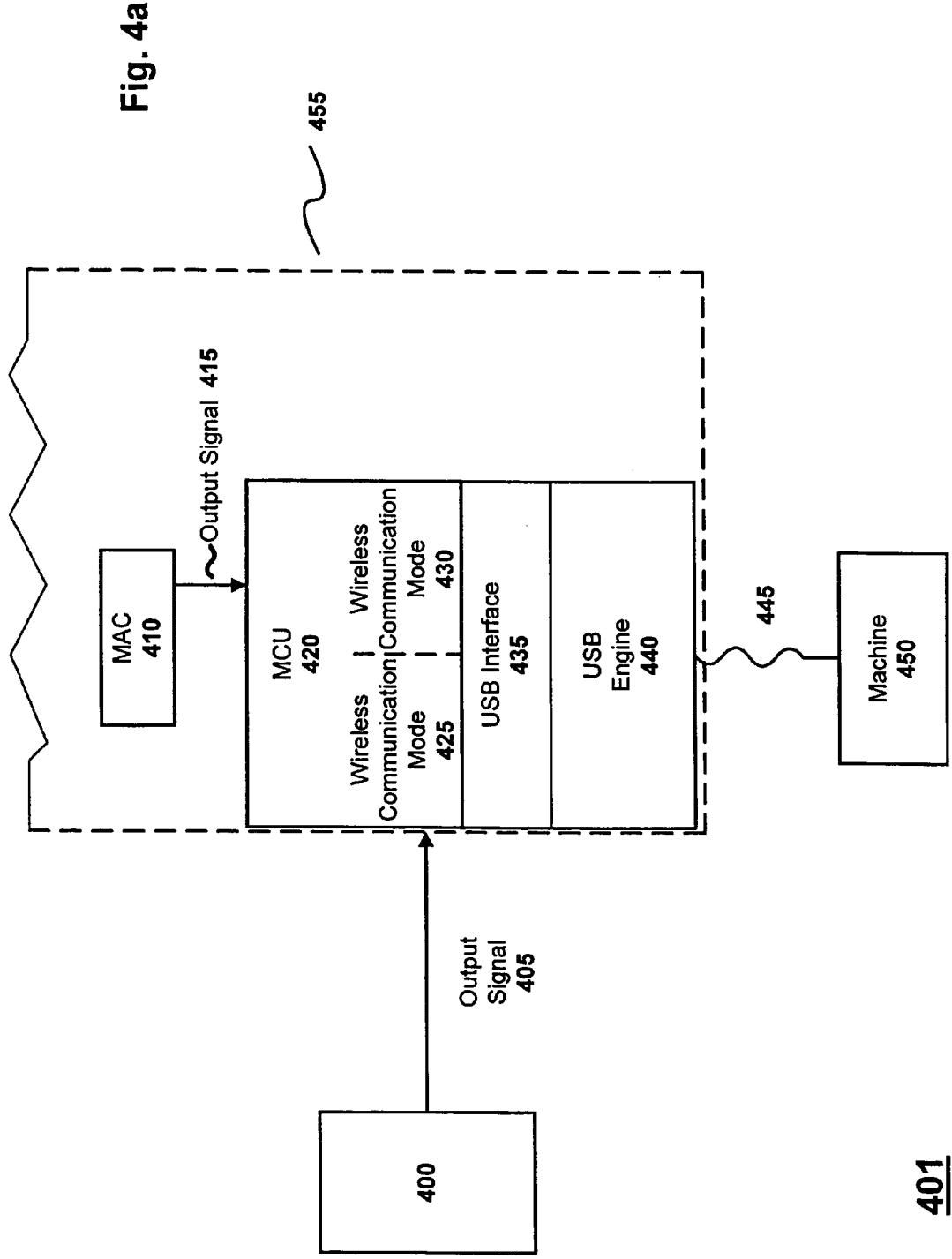

490

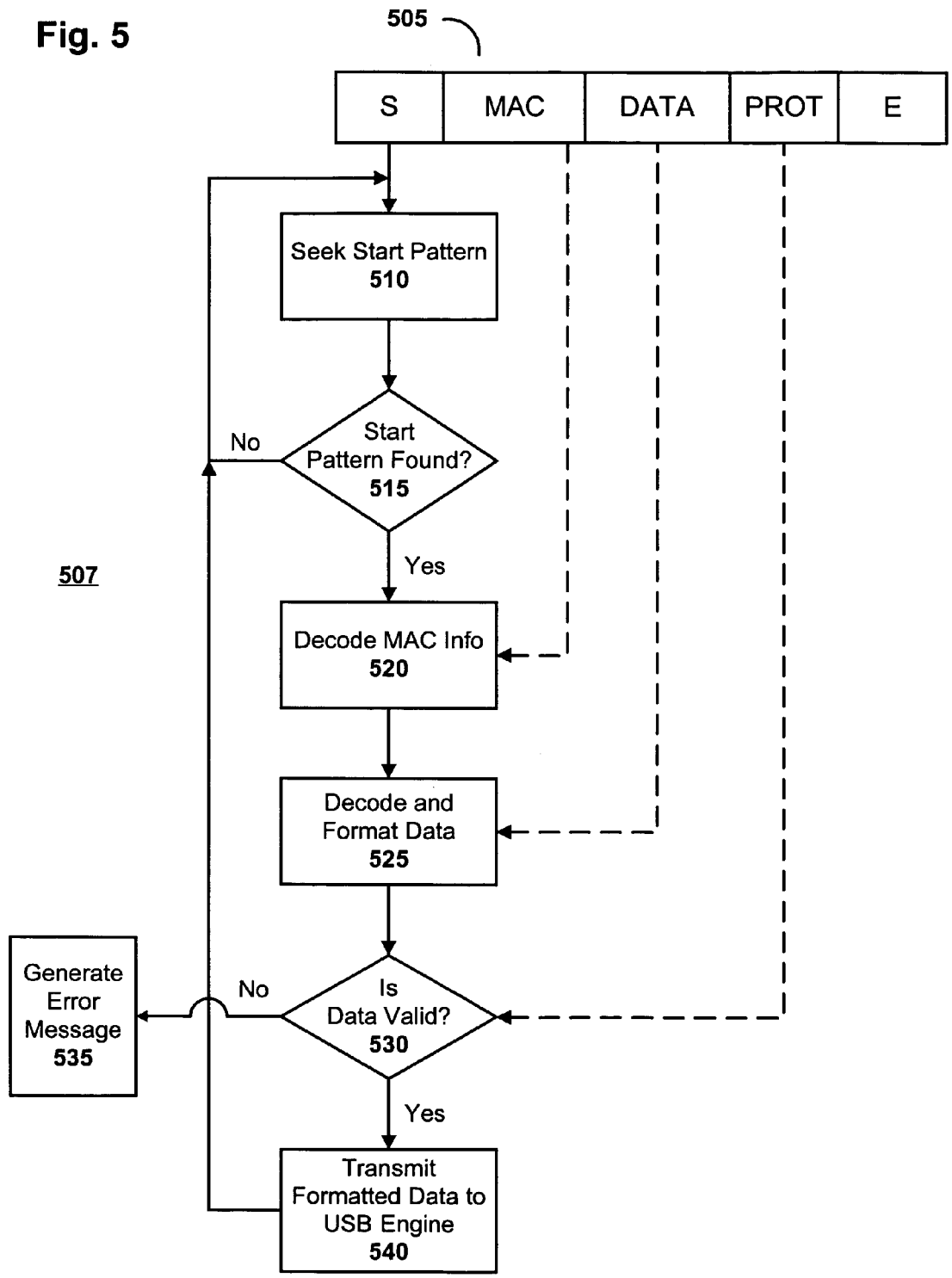

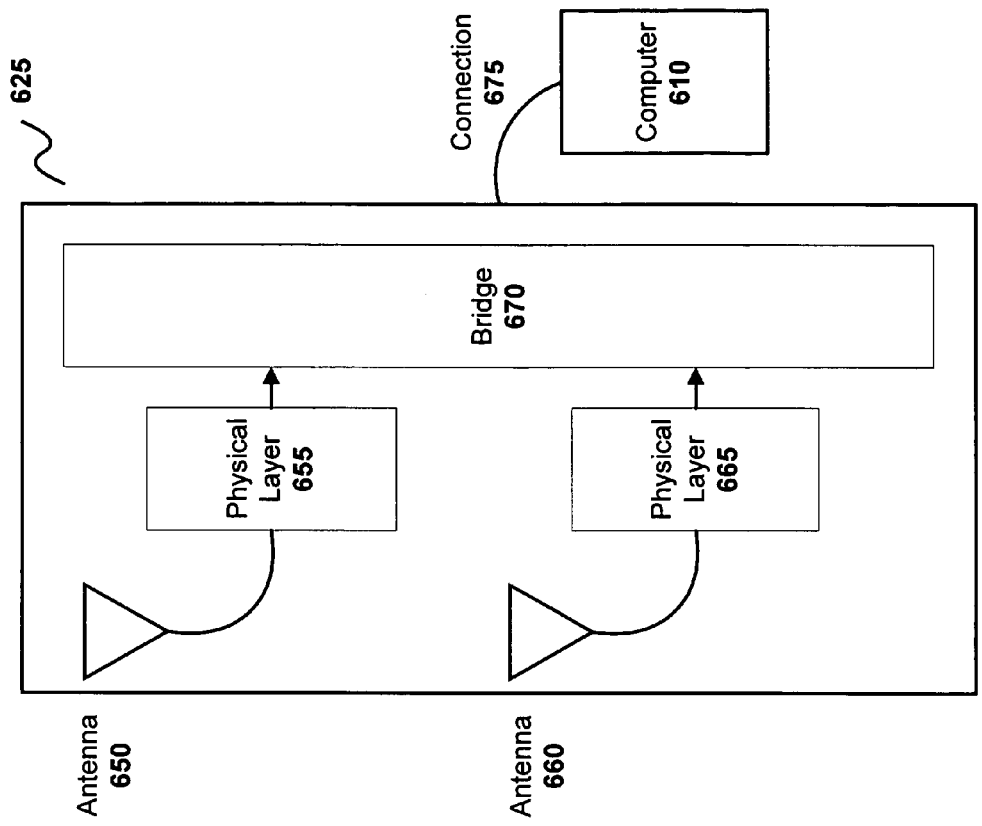
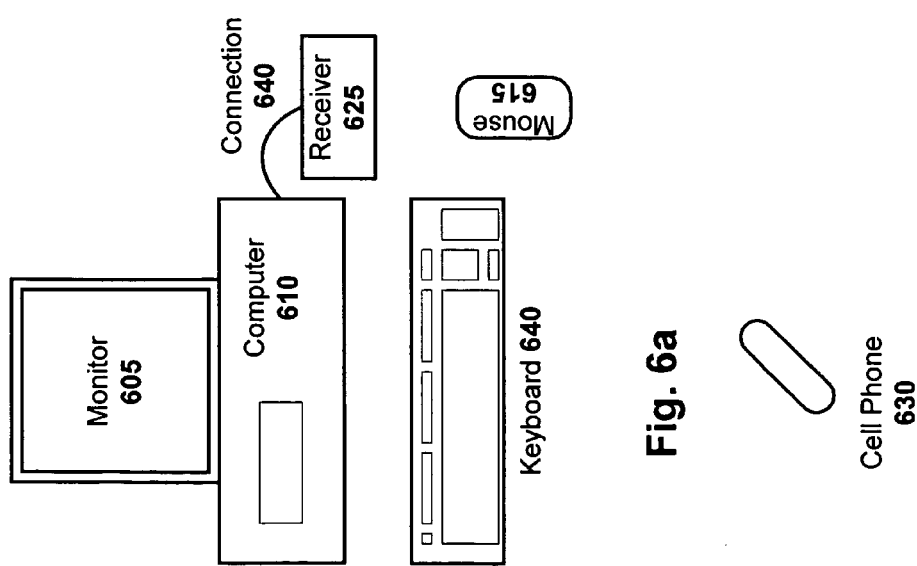
Fig. 6b
Fig. 6a

MULTI-PURPOSE BRIDGE FOR WIRELESS COMMUNICATIONS

BACKGROUND OF THE INVENTION

1. Field of the Invention

The invention relates to wireless communications, and more particularly to bridging technology that allows a wireless communications device to operate with at least two different wireless communication standards.

2. Description of the Related Art

The variety and availability of consumer electronic devices have created a need for a universal communications standard. The high cost and impracticality of providing a universal wired connection for all types of available electronic devices render wired technologies an unlikely vehicle to satisfy such a standard. Furthermore, retrofitting a universal wired standard into the quagmire of non-standardized infrastructure presently in place in homes and businesses would likely come at a significant cost and further supports the impracticality of such a standard. Additionally, wired technologies do not allow users to freely move about with their tethered devices. The Uniform Serial Bus (USB) standard is one example of a universal wired connection approach that is currently available. However, this standard requires a hard wire connection between itself and a communications device. Each such device, then, is required to have a cable of some kind in order to connect it to the USB. Thus, wired technologies are not likely to provide a viable solution to the growing need for a universal communications standard.

As an alternative to wired technologies, various wireless technologies are presently available. Wireless technologies provide the flexibility and mobility lacking in the wired technologies. However, incompatible communication standards employed by these various wireless technologies have limited their universal acceptance by users. More specifically, suppliers of configurable products (such as computers) are limited in the products they can supply because the interoperability between the various consumer electronic devices that make up those products is limited. For example, a first wireless computer peripheral (such as a hand-held personal information manager) employing one proprietary protocol may not function properly with a second computer peripheral (such as a wireless keyboard) employing another proprietary protocol that operates within the same frequency range. Thus, the supplier is limited to using either the first or the second PC peripheral, but not both.

In response to this problem of interoperability among the various wireless devices, several new universal open specification standards have come into play in the field of wireless communication technology and are rallying for global acceptance. These standards, such as Bluetooth, Shared Wireless Access Protocol (SWAP), IEEE 802.11 and IEEE 802.15, are intended to facilitate protected ad hoc wireless connections between PCs and consumer electronic devices in various communication environments. One frequency band in which such standards can operate is the license-free Instrumentation, Scientific and Medical (ISM) frequency band above 2.4 GHz. Spread Spectrum radio frequency (RF) technology and, in particular, frequency hopping schemes, are utilized for secure and robust wireless communications. These open specification standards may eventually result in a global standard by which all wireless communication is performed.

In view of these universal wireless communication standards, users will ultimately be able to connect to a wide range of computing and telecommunication devices easily without the need for any proprietary cables that connect one device to another. For example, a cellular phone employing Bluetooth technology could communicate with a Bluetooth compatible computer without the need for a hard wire connection between the two devices. However, some less ubiquitous wireless communication standards (e.g., those operating in the 27 MHz or 900 MHz range) nonetheless continue to enjoy success in the market place. Moreover, conversion of an entire product line from an established low cost standard to a universal standard such as SWAP or Bluetooth would involve significant labor and additional cost, as well as potential loss of established market share. Thus, there exists a need to provide a dual purpose bridge that allows a wireless communications device to operate using either the less ubiquitous wireless communication standards or the universal wireless communication standards.

Therefore, what is needed is a technology bridge that (1) provides dual mode operability of wireless devices; (2) allows both a ubiquitous wireless communication standard and a universal standard to operate for a particular wireless communications device; and (3) shares resources between the operable communication standards to reduce the cost of implementing any one standard.

BRIEF SUMMARY OF THE INVENTION

The present invention includes a dual-purpose bridge that allows for dual mode operability for a wireless communications device. For example, a dual purpose bridge according to the present invention allows both a less ubiquitous wireless communication standard and a universal wireless communication standard to operate for a particular wireless communications device. The resources existing between the bridged standards can be shared to reduce the cost of implementing any one standard. The particular standard being used can be determined and then the corresponding protocol can be employed.

The present invention includes a bridge that supports the operation of two or more modes of wireless communication. A "mode" of wireless communication may refer to an individual wireless communication standard, or an individual wireless communication system. For example, the first wireless communication mode supported can have an operating frequency of up to 1 GHz (e.g., 27 MHz, 900 MHz, or generally within the radio frequency band). The second wireless communication mode can have an operating frequency in a frequency band above 1 GHz (e.g., 1.88 GHz, 2.45 GHz, or generally within the microwave band). The outputs produced by each communication mode can be received at the dual purpose bridge. A determination as to which particular communication mode is being used is made within the dual purpose bridge, and a protocol that is associated with that communication mode can then be implemented.

In one embodiment, the dual purpose bridge can receive a baseband output signal of the physical layer of a first communication mode. Likewise, the dual purpose bridge can receive a baseband output signal of the physical layer of a second communication mode. The dual purpose bridge can be comprised of a microcontroller unit (MCU). The MCU can be a component of one of the communication modes. Alternatively, the MCU can exist independently of the communication modes. The MCU may execute one or more processes that identifies the communication mode associated with each baseband signal received, and then implements a protocol that corresponds to that identified mode. The data resulting from the executed process can then be transmitted to a data port, such as a universal serial bus (USB) interface and engine. The data port and its supporting resources may be a component of one of the communication modes, or may exist independently of the communication modes. Both the first and second modes can share the data port resources.

The process or processes executed in the MCU can be implemented with software, firmware, hardware or any combination thereof. Once a start pattern for a mode of wireless communication is detected, the corresponding protocol can then be implemented in processing the received signal. An exemplar type signal is a baseband signal that is comprised of data packets. Each data packet can be associated with a start pattern that can be used as a triggering identifier. The detection of this start pattern or triggering identifier, and the implementation of the corresponding protocol can be performed automatically. The media access control information corresponding to each packet can be decoded, and the data corresponding to that packet can also be decoded and formatted. Error checking can be performed to verify validity of the data. Once validated, the data can then be transmitted to the data port (e.g., USB data port) for routing to the target device.

The present invention provides a low cost wireless solution because devices that operate at lower frequencies (e.g., below 1 GHz) are typically less expensive than devices that operate at higher frequencies (e.g., above 1 GHz). Thus, a manufacturer may be able to offer those low cost solutions to consumers who cannot yet afford the higher costs associated with universal wireless communication modes such as, for example, Bluetooth or SWAP. Additionally, manufacturers will be able to use a bridged product in more applications than if just one communication standard was viable for that product. Thus, a user will have dual benefits of both high and low frequency wireless communication technologies. Additionally, and with respect to the low frequency system, the reduced bit rate, as well as a less complex system (e.g., not bi-directional), will reduce power consumption thereby maximizing the battery life of the transmitting device (e.g., mice, keyboards).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3 is a block diagram illustrating one embodiment of a bridge system for receiving a first output signal generated by one wireless communication system, and for receiving a second output signal generated by a second wireless communication system in accordance with the present invention.

FIG. 4a is a block diagram illustrating another embodiment of a bridge system for receiving a first output signal generated by a first wireless communication system, and for receiving a second output signal generated by a second wireless communication system in accordance with the present invention.

FIG. 5 is a flowchart illustrating one embodiment for processing an output signal in accordance with the present invention.

FIG. 6a is a block diagram of one embodiment of a bridged system in accordance with the present invention.

FIG. 6b is a block diagram of one embodiment of a receiver of a bridged system in accordance with the present invention.

DETAILED DESCRIPTION OF THE INVENTION

Figure 1:
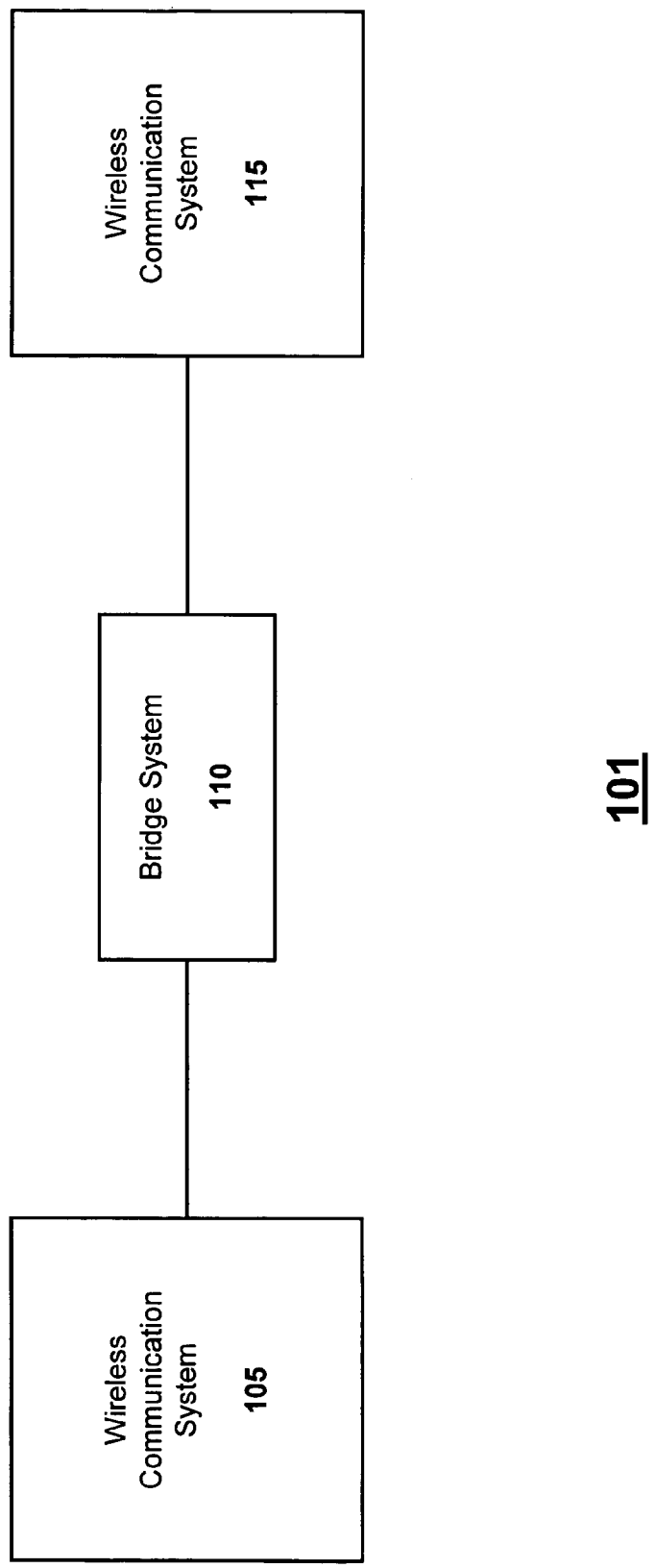
FIG. 1 is a general block diagram of one embodiment of a bridged system for wireless communications in accordance with the present invention.

FIG. 1 is a general block diagram of one embodiment of a bridged system for wireless communications in accordance with the present invention. Bridged system 101 includes a first wireless communication system 105, a bridge system 110, and a second wireless communication system 115. Both the first wireless communication system 105 and the second wireless communication system 115 are coupled to bridge system 110. Each wireless communication system 105 and 115 generates an output signal that is comprised of data packets (e.g., a baseband signal or a broadband signal). These output signals are each applied to bridge system 110. Those skilled in the art will appreciate the various forms of communication systems that generate an output signal comprised of data packets. For example, digital transactions in wireless communication systems where no clock or sync lines are available are generally embedded into packets. All such forms of communication systems are intended to be covered by this invention. Bridge system 110 interrogates the signal received to determine which communication system transmitted the signal, and then implements a corresponding protocol to process the data associated with that signal.

In general, baseband refers to a communications technique in which digital signals are placed onto the transmission line without a change in modulation. A baseband signal represents patterns of coded digital bits comprising the transmitted message. These patterns are contained in data packets. A baseband signal can be transmitted to an RF modulator that translates the baseband signal into an RF band signal (e.g., 27 MHz). Each packet of the baseband signal is comprised of header information and data. The header information can be used to identify, among other things, the particular communication standard that was used to transmit the packet. For example, the header information might indicate that the packet was transmitted pursuant to the Bluetooth protocol or other ISM band protocol such as the HomeRF, IEEE 802.11 or IEEE 802.15 protocols. Other signal types, such as broadband signals, are also comprised of data packets. Such output signals are intended to be covered by this invention.

In one embodiment, first wireless communication system 105 is representative of a system that operates in a frequency band from 100 KHz up to 1 GHz. Those skilled in the art will recognize many protocols that operate in this frequency band. For example, a protocol that generates a baseband signal and operates in a frequency range of 20 MHz to 40 MHz, or at approximately 27 MHz, or at approximately 900 MHz. For an exemplar description of one embodiment of communication system 105, refer to U.S. Pat. No. 5,881, 366, "Wireless Peripheral Interface." This patent is herein incorporated by reference in its entirety.

Second wireless communication system 115, on the other hand, can be representative of a system that operates in a frequency band above 1 GHz. Those skilled in the art will recognize many protocols that operate in a frequency band above 1 GHz. For example, a protocol that generates an output signal comprised of data packets and operates in a frequency range of 2.2 GHz to 2.6 GHz, or at approximately 2.4 GHz. The Bluetooth standard of the Bluetooth Special Interest Group, the Shared Wireless Access Protocol (SWAP) of the HomeRF Working Group, the Digital Enhanced Cordless Telecommunications (DECT) standard of the DECT Forum, and the IEEE 802.11 or 802.15 standards of the Institute of Electrical and Electronic Engineers are all examples of protocols that generate an output signal comprised of data packets (e.g., baseband signals) and operate above 1 GHz.

Figure 2:
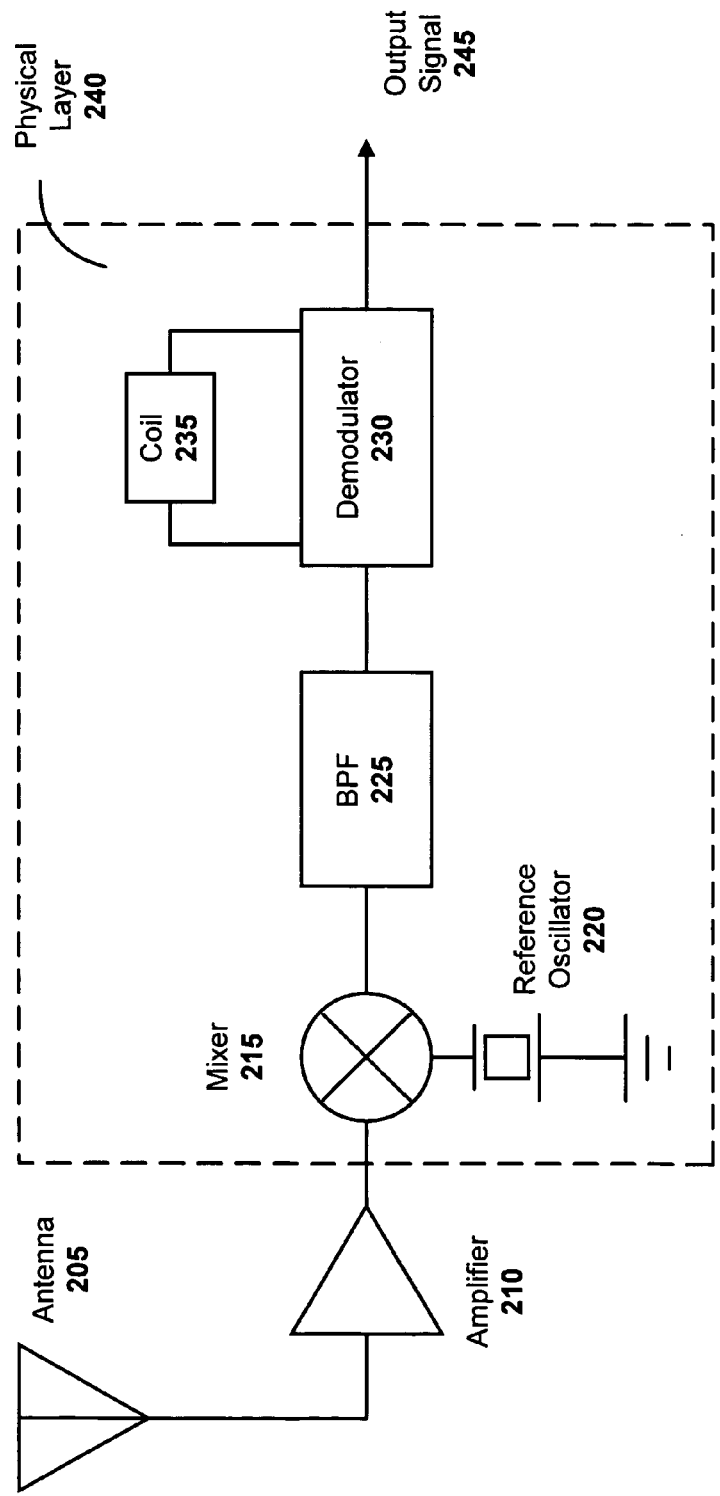
FIG. 2 is an exemplar block diagram illustrating one embodiment of a communication system for generating an output signal in accordance with the present invention.

FIG. 2 is an exemplar block diagram illustrating one embodiment of a communication system for generating an output signal in accordance with the present invention. Communication system 201 is comprised of an antenna 205, an amplifier 210 and a physical layer 240. Physical layer 240 is further comprised of a mixer 215, a reference oscillator 220, a band-pass filter 225, a demodulator 230 and a coil 235. Antenna 205 is coupled to amplifier 210, which is coupled to mixer 215. Mixer 215 is coupled to an output of amplifier 210, and is further coupled to an output from reference oscillator 220. An output of mixer 215 is coupled to an input of band-pass filter 225. An output of band-pass filter 225 is applied to an input of demodulator 230. Coil 235 is coupled to demodulator 230. Output signal 245 is output from demodulator 230.

Antenna 205 receives radiation information, and converts that radiation information to an equivalent electrical signal. That electrical signal is then applied to amplifier 210. Amplifier 210 amplifies the electrical signal to facilitate processing of the signal, and further provides impedance matching between antenna 205 and mixer 215. In an alternative embodiment, amplifier 210 is embedded with mixer 215 in a single component, and is implemented in a standard bipolar silicon technology. Alternatively, amplifier 210 can be a low-noise amplifier (LNA) that is implemented in gallium arsenide field effect transistors (GaAs FETs). Such a LNA minimizes the noise contribution of the amplifier. Thus, a desired signal-to-noise ratio can be maintained in the amplifier thereby improving the reliability and performance of the corresponding communication channel. Those skilled in the art will recognize other benefits of reducing the noise contribution of amplifier 210.

The output of amplifier 210 is then applied to mixer 215. Mixer 215 converts the frequency of the output of amplifier 210 to a lower frequency where signal processing (e.g., filtering) is easier to implement. The lower frequency is defined by the difference between the frequency of the output signal of amplifier 210 and the frequency of the reference signal provided by reference oscillator 220. Mixer 215 also generates a series of higher frequencies (e.g., a frequency that is defined by the sum of the frequency of the output of amplifier 210 and the frequency provided by reference oscillator 220). The outputs of mixer 215 are then applied to a band-pass filter 225.

Band-pass filter 225 is provided to attenuate the output signals of mixer 215 that have a frequency that is outside the passband of the filter. In contrast, the useful frequency output of mixer 215 is passed through band-pass filter 225 because it is within the passband. Band-pass filter 225 can be implemented in active or passive components. Additionally, filter 225 may be implemented in various technologies well known in the art. For example, band-pass filters of RF systems can be ceramic filters or SAW (Surface Acoustic Waves) filters. Such filters achieve higher performance (e.g., narrow bandwidth) than, for example, inductor/capacitor based filters. Those skilled in the art will appreciate that the design of a band-pass filter depends upon the desired filter characteristics (e.g., roll-off rate, gain, ripple, power consumption and physical size). Variations in filter design, as well as variations in other components described herein, are intended to be covered by this invention. The usable frequency output of band-pass filter 225 is applied to a demodulator 230.

Demodulator 230 is provided for decoding the frequency output of mixer 215 that was passed by band-pass filter 225. This is because the usable frequency output of mixer 215 is essentially a modulated signal. For example, the amplitude of the output signal of amplifier 210 is modulated (varied) at a rate equal to the frequency difference between the output signal frequency of amplifier 210 and the signal frequency provided by reference oscillator 220. Thus, this frequency difference can be used to define an envelope of the frequency modulated output of mixer 215. Demodulator 230 demodulates the amplitude of the output signal of amplifier 210 by essentially extracting that signal from the envelope. Coil 235, also referred to as a quadrature coil, provides tunable inductance to facilitate this demodulation. The output of demodulator 230 is output signal 245. Output signal 245 can be, for example, a baseband signal. However, output signal 245 need not be a baseband signal. For example, signal 245 can be a broadband signal, or the output of any communication system where the output is comprised of data packets that digitally represent the transmitted information.

In one embodiment, the signal received by antenna 205 is at a frequency of about 27 MHz. For example, a wireless keyboard that has a transmission frequency of about 27.145 MHz, or a wireless mouse might have a transmission frequency of about 27.045 MHz. Additionally, assume (for the sake of discussion purposes only) that the frequency of reference oscillator 220 is approximately 455 KHz less than the transmission frequency. Thus, in considering the wireless keyboard example, the frequency of the reference oscillator 220 is about 27.145 MHz–455 KHz. As such, the low frequency output of mixer 215 is therefore approximately (27.145 MHz–(27.145 MHz–455 KHz)), which is approximately 455 KHz. So the amplitude of the 27.145 MHz transmission signal is varied at a rate approximately equal to 455 KHz. This modulated signal passes through band-pass filter 225. Demodulator 230 then demodulates the modulated signal and outputs signal 245.

The demodulation method described above is referred to as a single conversion frequency shift keying (FSK) demodulation. Other techniques can also be employed such as dual conversion FSK demodulation, amplitude shift keying (ASK) demodulation, zero intermediate frequency (IF) demodulation. Such modulation/demodulation techniques are well known in the art. The above discussion is solely provided to illustrate exemplar embodiments of communication systems and to facilitate discussion. Thus, such example embodiments are not offered as limitations on the present invention. Those skilled in the art will recognize many other embodiments and variations of modulation techniques and communication systems, and such other embodiments and variations are intended to be covered by the present invention as defined in the claims herein.

FIG. 3 is a block diagram illustrating one embodiment of a bridge system for receiving a first output signal generated by one wireless communication system, and for receiving a second output signal generated by a second wireless communication system in accordance with the present invention. Bridge system 301 is comprised of an antenna 305, a physical layer 310, an integrated circuit (IC) 355, and a host 350. IC 355 is further comprised of an antenna 320, an impedance matching 325, a physical layer 330, a media access control (MAC) 335, and a microcontroller unit (MCU) 345. Antenna 305 is coupled to physical layer 310 that produces output signal 315. Antenna 320 is coupled with an impedance matching 325 that is further coupled with physical layer 330. Physical layer 330 is coupled with MAC 335 that is further coupled to MCU 345. MCU 345 receives output signal 315 and output signal 340, and is further coupled to host 350. In one embodiment, output signal 315 and output signal 340 are baseband signals.

As previously explained, output signal 315 is generated by physical layer 310 and digitally represents the radiation information received by antenna 305 in packet form. Antenna 305, for example, can be an RF antenna for receiving signals having frequencies of about 1 GHz or less. Physical layer 240 of FIG. 2 can represent an example embodiment of physical layer 310. Antenna 320 receives a second kind of radiation information and provides that information to impedance matching 325. For example, antenna 320 can be a microwave antenna for receiving signals having frequencies of about 1 GHz or greater. Impedance matching 325 provides necessary impedance matching and isolation between antenna 320 and physical layer 330.

An output of impedance matching 325 is received by physical layer 330. Physical layer 330 can very depending upon what communication system is being utilized. For example, Bluetooth technology will have a particular physical layer while SWAP technology will have another. Those skilled in the art will recognize the various components that comprise a physical layer of a particular communication system as well as distinctions between the various physical layers. Methods of interference cancellation can be employed in physical layer 330 to ensure a robust and reliable communication system. For example, a time diversity method involves transmitting the same information multiple times by using a predetermined time interval. A frequency diversity method, on the other hand, involves spreading the information on several different frequencies within the bandwidth of the communication system. For example, frequency hopping and spread spectrum schemes are two technologies that can be used to achieve frequency diversity.

An output of physical layer 330 is applied MAC 335. MAC 335 is specific to the type of physical medium over which the communication takes place, and controls access to that medium. Thus, the function and composition of MAC 335 is dependent on the type of physical layer 330 employed, and those skilled in the art will recognize the elements that comprise a MAC of a particular communication system as well as distinctions between the various MACs. MAC 330 can be implemented in software, firmware, hardware or any combination thereof. Output signal 340 is output by MAC 335 and is applied to Microcontroller Unit (MCU) 345.

MCU 345 may comprise a microprocessor or central processing unit (CPU) and a memory (e.g., random access memory). MCU 345 may also comprise other support functions such as a read only memory, I/O ports, timers, and a data port interface and supporting resources (e.g., USB engine). A microcontroller (e.g., MCU 345) can be designed for a very specific task such as to control a particular system. Thus, a microcontroller provides a reliable and highly definable component that can perform such functions as receive data, manipulate data, execute instructions that act on data, monitor system parameters, and generally control an overall process. As a result, its components can be varied as is required by the particular application. An output of MCU 345 is then applied to host 350.

MCU 345, in one embodiment of the present invention, can have one I/O per link, and can further have the capability to process one million instructions per second (MIPS) per link. Additionally, MCU 345 may support a number of links (also referred to as a communication channels) for each communication system being bridged by bridge system 301. For example, a first communication system may have two communication channels: (1) one for a wireless keyboard (e.g., at about 27.145 MHz) and, (2) one for a wireless mouse (e.g., at about 27.045 MHz). A second communication system may have only one communication channel (e.g., at about 2.45 GHz). Thus, MCU 345 of bridge system 301 would have at least three available I/Os (one for each communication channel) and have the capability to process at least one MIPS per channel (with respect to the 27 MHz links).

As stated above, antenna 320, impedance matching 325, physical layer 330, MAC 335 and MCU 345 can all be contained on a single IC 355. Alternatively, each of these items can exist separately from one another or comprise an embedded system. Moreover, each item can exist in a discrete component residing on a printed circuit board. Software, firmware and or hardware may be used to realize the structure and function of each component. Those skilled in the art will appreciate various other forms that such components can be embodied in. Regardless of form, the functionality of each component is generally the same although individual parameters related to performance may vary from form to form. As such, the form of these components may be defined by the performance goals of the particular communication system. Moreover, economic considerations and manufacturability may make one form more desirable than another form. For example, an integrated circuit solution such as IC 355 may be desirable because it enables and simplifies mass-production.

FIG. 4a is a block diagram illustrating another embodiment of a bridge system for receiving a first output signal generated by a first wireless communication system, and for receiving a second output signal generated by a second wireless communication system in accordance with the present invention. More specifically, bridge system 401 is comprised of a communication system 400, a communication system 455 and a machine 450. Communication system 455 is further comprised of a MAC 410, a MCU 420, a universal serial bus (USB) interface 435, and a USB engine 440. Two communication modes operate within the MCU 420: a wireless communication mode 425 and a wireless communication mode 430. Communication system 400 outputs an output signal 405 that is applied to wireless communication mode 425 of MCU 420. MAC 410 outputs an output signal 415 that is applied to wireless communication mode 430 of MCU 420. In one embodiment, output signal 405 and output signal 415 are baseband signals. Alternatively, these output signals can be a signal that is comprised of data packets as explained above. MCU 420 is coupled with USB interface 435, which is further, coupled to USB engine 440. An output of USB engine is applied to machine 450.

Wireless communication mode 425 detects the receipt of output signal 405 from communication system 400. Once output signal 405 is detected, wireless communication mode 425 implements the appropriate protocol, and the packet data corresponding to the detected output signal can be processed pursuant to that protocol. Likewise, wireless communication mode 430 detects the receipt of output signal 415 from MAC 410. Once output signal 415 is detected, wireless communication mode 430 implements the appropriate protocol, and the packet data corresponding to the received output signal can be processed pursuant to that protocol. The detection and processing of the output signal can be implemented in hardware, firmware or software. In an alternative embodiment, MCU 420 (as well as wireless communication modes 425 and 430) can exist independently of communication system 455.

USB interface 435 of communication system 455 can be used to provide the appropriate interface between each wireless communication modes (425 and 430) and the USB engine 440, also of communication system 455. Alternatively, USB interface 435 and USB engine 440 can exist independently of communication system 455. USB interface 435 implements the USB protocol on data it receives from either of the communication modes. The output of USB engine 440 can be coupled by connection 445 to machine 450. Thus, USB interface 435 and USB engine 440 provide a data port from communication system 455 to machine 450. Other data ports, such as a PS/2 data port or an IEEE 1394 data port, can be used in place of a USB data port. Machine 450 may be a computer. For example, machine 450 may be a conventional personal computer (PC), a lap top computer, a MAC computer, a personal digital assistant, a workstation, or a function specific computer. The computer may include a conventional operating system such as Microsoft Windows™, Palm OS™, LINUX, UNIX or a function specific operating system. Alternatively, machine 450 can be a receiver unit or a peripheral device. Connection 445 can be implemented by either wire or wireless technology.

In one embodiment, communication system 400 can operate in a frequency band of approximately 20 MHz to 40 MHz (e.g., about 27 MHz), while communication system 455 can operate in a frequency band of approximately 1.0 GHz to 10 GHz (e.g., about 2.4 GHz). Wireless communication mode 425 detects an output signal from communication system 400 and implements the protocol corresponding to that system. Wireless communication mode 430 detects an output signal from communication system 455 and implements the protocol corresponding to that system.

Alternatively, communication system 400 can be any wireless communication technology, such as voice, radio or television technology, that operates up to 1 GHz (e.g., 900 MHz), and wireless communication mode 425 will detect that technology and implement the corresponding protocol. On the other hand, communication system 455 can be any wireless communication technology, such as radar, ISM, microwave, or infrared, that operates above 1 GHz (e.g., 1.89 GHz or 2.45 GHz), and wireless communication mode 430 will detect that technology and implement the corresponding protocol.

Alternatively, communication system 400 can have an input frequency in the radio frequency range, and wireless communication mode 425 can implement a protocol that corresponds to an output signal generated by that system 400. In contrast, communication system 455 can have an input frequency in the microwave frequency range, and wireless communication mode 430 can implement a protocol that corresponds to an output signal generated by that system 455.

Figure 4B:
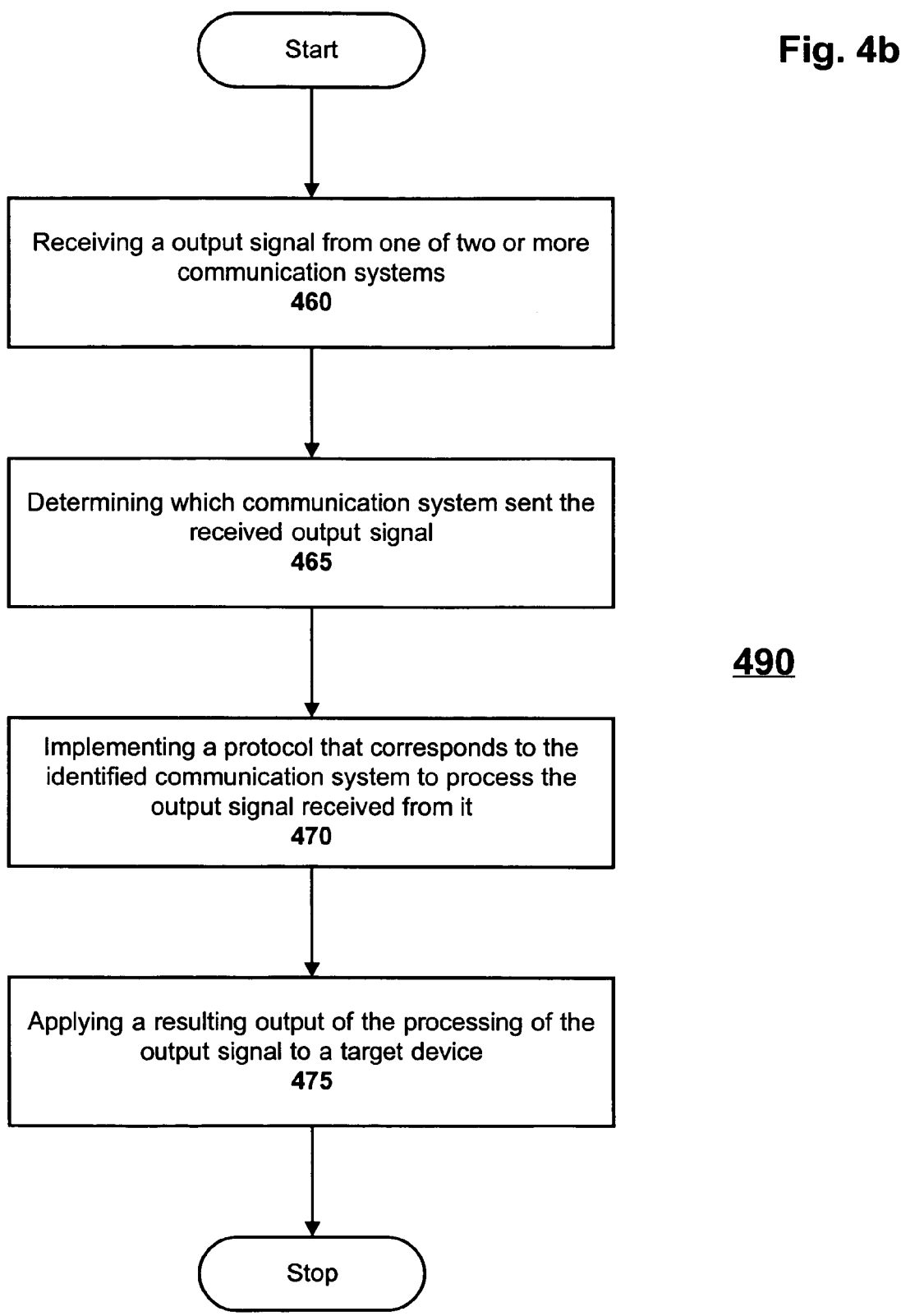
FIG. 4b is a flowchart illustrating one embodiment of a bridge system process for receiving an output signal generated by one of two or more wireless communication systems in accordance with the present invention.

FIG. 4b is a flowchart illustrating one embodiment of a bridge system process for receiving an output signal generated by one of two or more wireless communication systems in accordance with the present invention. Process 490 is comprised of steps 460, 465, 470, and 475. Process 490 may begin by receiving 460 an output signal from one of two or more communication systems. For example, first and second communication systems might operate in a frequency band below 1 GHz and generate a baseband signal. A third communication system, on the other hand, may operate in a frequency band equal to or above 1 GHz and generate a baseband signal. Thus, with regard to this example, the first and second communication system might operate at a frequency of approximately 27 MHz, plus or minus 1 MHz. The third communication system might operate at a frequency of approximately 2.4 GHz, plus or minus 480 MHz.

Once an output signal is received by the bridge system, a determination 465 as to which communication system sent the signal can then be made. This determination can be made by detecting an identifier associated with the received output signal. The identifier can be unique to a particular communication system thereby simplifying determination 465. Process 490, which can be implemented in part or in its entirety in an MCU (e.g., MCU 345 of FIG. 3 or MCU 420 FIG. 4a) or other equivalent environment suitable for running a real-time process, can be configured to run in a loop mode until an output signal comprising data packets is received. While running in a loop mode, process 490 can seek an identifier associated with a particular communication system. Once the identifier is detected, process 490 can then implement 470 the corresponding protocol in handling the received output signal.

Alternatively, each of the two or more communication systems sending output signals to the bridge system can have its own process 490 running in an MCU or the like. Each process 490 can be run in a loop mode for the purpose of making determination 465, and more specifically, for the purpose of detecting the receipt of an output signal from the corresponding communication system of that process. Each process 490 can be associated with a triggering identifier as discussed above. Once process 490 detects a triggering identifier of a received output signal, that process 490 can then implement 470 the protocol that is required in processing that signal. Thus, each received output signal from one communication system is detected and processed independently of output signals received from other communication systems.

Once a process 490 associated with the received output signal has implemented 470 the appropriate protocol for further processing the signal, the results of that processing can be applied 475 to the target device. For example, the processing associated with the protocol may involve the decoding and formatting of the data of the received output signal pursuant to the appropriate protocol. The resulting data of this decoding and formatting process can then be applied to the target device. Typically, an interface is provided between the process and the target device. For example, an external bus standard such as a USB data port or an IEEE 1394 data port or a PS/2 data port can be provided to transmit the resulting data to its target. Likewise, a conventional serial or parallel data port can be provided to transmit the resulting data to its target.

FIG. 5 is a flowchart illustrating one embodiment for processing an output signal in accordance with the present invention. An MCU unit of one of the bridged communication systems can be used to process the packet data of the output signals that are received from the communication systems. In one embodiment, an MCU of a communication system that operates in the microwave frequency range (e.g., above 1 GHz) is used to process the packet data of the baseband signals received. Alternatively, the MCU of a communication system that operates in the RF range (e.g., 1 MHz to 950 MHz) is used to process the packet data of the baseband signals received. Regardless of the location of the MCU, it can detect which type of communication system has generated each output signal received, and then implement the appropriate protocol to process the signals received. The detection and processing can be implemented with software, firmware, hardware or any combination thereof.

Continuing with FIG. 5, data packet 505 can be received by the processing MCU (e.g., MCU 345 of FIG. 3 or MCU 420 FIG. 4a). In the embodiment shown, the data packet consists of five fields. The S field can be used to indicate the beginning of the data packet. For example, the S field can contain a start pattern that can be used as a triggering identifier. The MAC field is used to provide the media access control information. Such information is specific to the type of physical medium over which the corresponding communication system operates, and defines the corresponding media access protocol. Additionally, a data-type can be embedded in the MAC field. This data-type can be used to indicate the type of communication system that generated the data packet (e.g., a 27.045 MHz mouse or a 27.145 MHz keyboard or a 2.45 GHz cell phone). The data-type can also be used to specify processing instructions or operands that can be utilized in processing the data packet. The DATA field contains the data that is being transmitted to a target device. For example, the DATA field might contain cursor position information from a wireless mouse being transmitted to a receiving unit coupled to the display where the cursor is located. The PROT field can be used to implement an error detection scheme such as cyclic redundancy check (CRC) so that any transmission errors can be corrected. Various error detection techniques can be implemented for most communication protocols. The E field can be used to indicate the end of the data packet.

Data packet 505 is provided as an example of a possible data packet structure. Those skilled in the art will appreciate a multitude of variations on this example in accordance with the present invention, and such variations are intended to be covered by this invention. For example, other forms of header information such as the address of the target machine can be transmitted in the packet header. Additionally, there can be more than one data field. Moreover, the size of each field is dependent upon the individual communication systems and applications. Additionally, as an alternative to embedding the data-type in the MAC field, the data-type can be represented in its own field (e.g., DATATYPE field between the S and MAC fields). Thus, the present invention is intended to function with any form of packet data structure providing that packet includes the requisite information needed in processing that packet (e.g., a triggering identifier or start pattern, or the identity of the communication system that transmitted the packet).

A process or wireless communication mode running in an MCU or equivalent processing environment can be used to seek 510 a start pattern. For example, when a data packet is received, its S field can be interrogated to determine 515 if a start pattern or triggering identifier has been detected. If not, then the process continues to loop and waits to receive a packet with a particular start pattern. In one embodiment, the packet is a baseband packet. Alternatively, the packet can be a broadband packet. If a start pattern is detected, then the MAC field can be interrogated to extract the MAC information. The MAC information, such as the corresponding MAC protocol and or a data-type or communication system identifier, can then be decoded 520 and made available to the process. The data from the DATA field can then be decoded and formatted 525 in accordance with the decoded MAC information. At this point, a determination 530 is made as to whether the data from the DATA field is valid. If not, then the data can be rejected and an error message can be generated 535 so that appropriate action can be taken (e.g., resend the data). If the data is determined to be valid, however, then it can be transmitted 540 to the USB engine. The USB engine then transmits the data to the target device. As noted earlier, data port types other than the USB type can be implemented to achieve the transmission of data to the target device.

Those skilled in the art will appreciate that the process flow may be dependent, in part, on the data packet structure. Thus, variations in the data packet structure will result in variations on the process flow. These variations, such as the inclusion of address decoding, are intended to be covered by the present invention.

FIG. 6a is a block diagram of one embodiment of a bridged system in accordance with the present invention. System 601 is comprises of a monitor 605, a computer 610, a wireless mouse 615, keyboard 620, a receiver 625, and a cell phone 630. Monitor 605 and computer 610 are coupled together as conventionally done. An output of receiver 625 is coupled to a universal data port (e.g., a USB data port or a PS/2 data port) of computer 610 via connection 640. Connection 640 is implemented in a wire or other conventional means.

Receiver 625 is capable of receiving wireless communication from wireless keyboard 620, wireless mouse 615 and/or cell phone 630. In one embodiment, wireless keyboard 620 operates at a frequency of about 27.145 MHz, and generates a baseband signal that can be received by receiver 625. Additionally, wireless mouse 615 operates at a frequency of about 27.045 MHz, and generates a baseband signal that can be received by receiver 625. Additionally, cell phone 630 operates at a frequency of about 2.45 GHz, and generates a baseband signal that can be received by receiver 625. Receiver 625 detects each baseband signal and implements the protocol that corresponds to the particular device, whether it is wireless keyboard 620, wireless mouse 615 and/or cell phone 630. No extraneous or proprietary cabling is needed for these communications to take place.

FIG. 6b is a block diagram of one embodiment of a receiver of a bridged system in accordance with the present invention. Receiver 625 is comprised of an antenna 650, a physical layer 655, an antenna 660, a physical layer 665 and bridge 670. Antenna 650 is coupled to physical layer 655. The combination of antenna 650 and physical layer 655 are referred to as a front-end of a first communication system. This first communication system operates within a particular frequency range (e.g., 26 MHz to 28 MHz). Antenna 660 is coupled to physical layer 665. The combination of antenna 660 and physical layer 665 are referred to as a front-end of a second communication system. This second communication system operates within a particular frequency range (e.g., 2 GHz to 4 GHz).

The outputs (comprised of data packets) of the first and second communication systems are applied to bridge 670.

Bridge 670 detects each output signal, decodes the data comprising the data packets. The decoded data can also be processed in response to instructions associated with the packet. One embodiment of bridge 670 is a processor capable of performing process 490 of FIG. 4b. Alternatively, bridge 670 is an MCU configured to receive baseband signals from two or more communication systems such as MCU 345 of FIG. 3. An output of bridge 670 comprising the decoded and process data can then be applied to a universal data port and directed to target device 610 via connection 675.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for receiving an output signal from one of a first wireless communication device operating in a first frequency range or a second wireless communication device operating in a second frequency range, the method comprising:
   receiving the output signal at a processor;
   identifying whether the first wireless communication device or the second wireless communication device sent the output signal based on information included in the output signal; and
   implementing a protocol that corresponds to the identified wireless communication device, wherein in response to identifying the first wireless communication device, a first protocol is implemented, and in response to identifying the second wireless communication device, a second protocol is implemented.

2. The method of claim 1 wherein the output signal is one of a baseband signal and a broadband signal.

3. The method of claim 1 wherein the first frequency range is from about 100 KHz to about 1 GHz.

4. The method of claim 1 wherein the first frequency range is from about 26 MHz to about 28 MHz, or from about 800 MHz to about 1 GHz.

5. The method of claim 1 wherein the second frequency range is from about 1 GHz to about 10 GHz.

6. The method of claim 1 wherein the second frequency range is from about 1.8 GHz to about 2.0 GHz, or from about 2 GHz to about 4 GHz.

7. The method of claim 1 wherein the processor has a first process for detecting and processing an output signal from the first wireless communication device, and a second process for detecting and processing an output signal from the second wireless communication device.

8. The method of claim 1 further comprising:
   decoding a set of MAC information associated with the output signal.

9. The method of claim 1 further comprising:
   decoding and formatting data associated with the output signal.

10. The method of claim 1 further comprising:
    verifying data associated with the output signal is valid; and
    responsive to the data being valid, transmitting the data to a data port that is operatively coupled to the processor.

11. The method of claim 1 wherein the method is implemented by at least one of software, firmware, or hardware.

12. The method of claim 1 wherein the identifying includes determining a device type.

13. The method of claim 12, wherein the device type is one of a mouse, a keyboard, or a cell phone.

14. The method of claim 12, wherein in response to determining the type of the wireless communications device to be a mouse, implementing the corresponding protocol includes formatting payload data in the output signal as cursor position data.

15. A system for receiving an output signal from one of a first wireless communication device operating in a first frequency range or a second wireless communication device operating in a second frequency range, the system comprising:
    a processor for receiving the output signal, wherein the processor is adapted to:
       identify whether the first wireless communication device or the second wireless communication device sent the output signal based on information included in the output signal; and
       implement a protocol that corresponds to the identified wireless communication device, wherein in response to identifying the first wireless communication device, a first protocol is implemented, and in response to identifying the second wireless communication device, a second protocol is implemented.

16. The system of claim 15 wherein the processor has access to a memory that is configured to receive the output signal.

17. The system of claim 16 wherein the memory has a first section and a second section, wherein the first section has a first process for detecting and processing an output signal from the first wireless communication device, and the second section has a second process for detecting and processing an output signal from the second wireless communication device.

18. The system of claim 15, wherein the output signal is one of a baseband signal and a broadband signal.

19. The system of claim 15 wherein the first frequency range is from about 100 KHz to about 1 GHz.

20. The system of claim 15 wherein the first frequency range is from about 26 MHz to about 28 MHz, or from about 800 MHz to about 1 GHz.

21. The system of claim 15 wherein the second frequency range is from about 1 GHz to about 10 GHz.

22. The system of claim 15 wherein the second frequency range is from about 1.8 GHz to about 2.0 GHz, or from about 2 GHz to about 4 GHz.

23. The system of claim 15 wherein the processor is adapted to:
    decode a set of MAC information associated with the output signal.

24. The system of claim 15 wherein the processor is adapted to:
    decode and format data associated with the output signal.

25. The system of claim 15 wherein the processor is adapted to:
    verify data associated with the output signal is valid; and
    responsive to the data being valid, transmit the data to a data port that is operatively coupled to the processor.

26. The system of claim 15 wherein the processor is a component of one of the first wireless communication device or the second wireless communication device.

27. A computer readable medium comprising a plurality of instructions, which when executed by a processor, cause the processor to perform the steps of:

identifying whether a first wireless communication device operating in a first frequency range or a second wireless communication device operating in a second frequency range sent an output signal received by the processor, wherein the identifying is based on information included in data packets comprising the output signal; and implementing a protocol that corresponds to the identified wireless communication device, wherein in response to identifying the first wireless communication device, a first protocol is implemented, and in response to identifying the second wireless communication device, a second protocol is implemented.

28. A receiver apparatus for receiving wireless communications from a number of wireless communication devices, the apparatus comprising:
- a first I/O port for receiving communication information from a first wireless device operating in a first frequency range;
- a second I/O port for receiving communication information from a second wireless device operating in a second frequency range; and
- a processor for effecting upon received communication information a protocol that corresponds to one of the first or second wireless communication devices in response to determining which wireless communication device sent the communication information.

29. The apparatus of claim 28, further comprising:
- a third I/O port for receiving communication information from a third wireless device operating in the first frequency range.

30. The apparatus of claim 29, wherein the first wireless communication device has a communication channel for a wireless keyboard and the third wireless communication device has a communication channel for a wireless mouse, and communication information from the wireless keyboard is received by the first I/O port, and communication information from the wireless mouse is received by the third I/O port.

31. The apparatus of claim 28, further comprising:
- a data port operatively coupled to the processor for providing an interface between the apparatus and a host system.

32. The apparatus of claim 28, wherein the communication information from the second wireless communication device is provided to the second I/O port by a media access control module associated with the second wireless communication device.

33. The apparatus of claim 28, further including a memory operatively coupled to the processor, the memory storing a set of instructions that, when executed by the processor, cause the processor to determine from which wireless communication device communication information was received, and to effect a protocol corresponding to that wireless communication device.

34. The apparatus of claim 28, wherein the I/O ports and the processor are included in a microcontroller unit.

35. The apparatus of claim 28 wherein the I/O ports and the processor are components of one of the first wireless communication device or the second wireless communication device.

36. The apparatus of claim 28 wherein the output signal is one of a baseband signal and a broadband signal.

37. The apparatus of claim 28 wherein the first frequency range is from about 100 KHz to about 1 GHz.

38. The apparatus of claim 28 wherein the first frequency range is from about 26 MHz to about 28 MHz, or from about 800 MHz to about 1 GHz.

39. The apparatus of claim 28 wherein the second frequency range is from about 1 GHz to about 10 GHz.

40. The apparatus of claim 28 wherein the second frequency range is from about 1.8 GHz to about 2.0 GHz, or from about 2 GHz to about 4 GHz.

41. A method for receiving an output signal from one of a first wireless computer peripheral device operating in a first frequency range or a second wireless computer peripheral device operating in a second frequency range, the method comprising:
- receiving the output signal at a processor;
- identifying whether the first wireless computer peripheral device or the second wireless computer peripheral device sent the output signal based on information included in the output signal; and
- implementing a protocol that corresponds to the identified wireless computer peripheral device, wherein in response to identifying the first wireless computer peripheral device, a first protocol is implemented, and in response to identifying the second wireless computer peripheral device, a second protocol is implemented.

42. The apparatus of claim 41, wherein the first and the second wireless computer peripheral devices each includes one of a wireless keyboard, a wireless mouse, a wireless personal digital assistant, or a wireless printer.

* * * * *